No. 763,392.

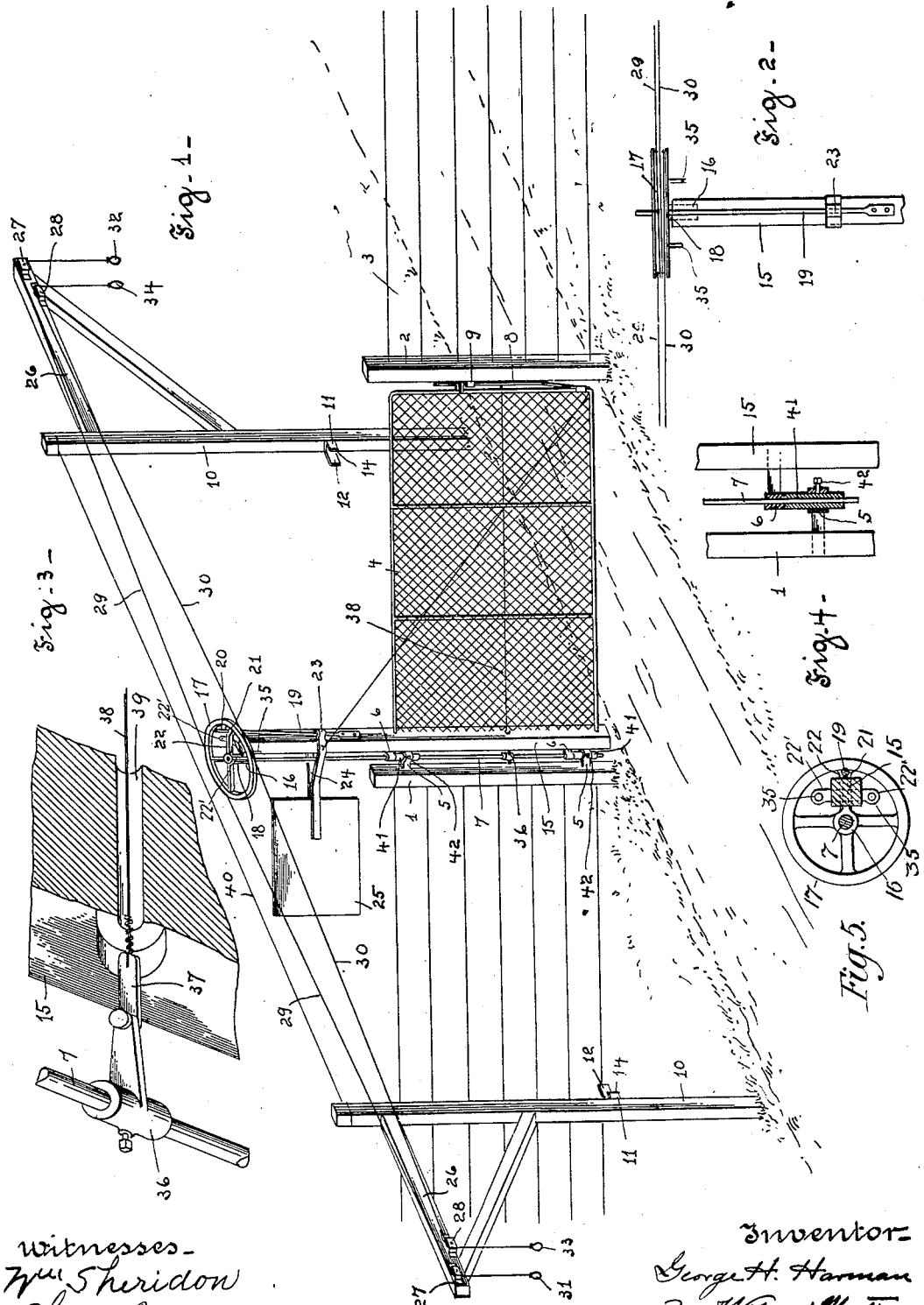

Patented June 28, 1904.

UNITED STATES PATENT OFFICE.

GEORGE H. HARMAN, OF PRAIRIE DEPOT, OHIO.

FENCE-GATE.

SPECIFICATION forming part of Letters Patent No. 763,392, dated June 28, 1904.

Application filed January 2, 1904. Serial No. 187,417. (No model.)

*To all whom it may concern:*

Be it known that I, GEORGE H. HARMAN, a citizen of the United States, residing at Prairie Depot, in the county of Wood and State of Ohio, have invented a new and useful Improvement in Fence-Gates, of which the following is a specification.

My invention relates to a fence-gate, and has for its object to provide a gate of the kind that is adapted to be opened in either direction from a closed position and to be readily opened in the direction of travel by the driver of a vehicle or the rider of a horse without dismounting and in like manner closed after passing and which is also so balanced that wind-pressure does not affect the movement of the gate.

The objects of my invention are accomplished as hereinafter described, and illustrated in the drawings, in which—

Figure 1 is an isometric view showing a gate constructed in accordance with my invention in the closed position. Fig. 2 shows the spring-rod in its normal position when the gate is locked in open position to either of the outposts or in closed position to the latch-post of the fence. Fig. 3 is an isometric view showing the cord attachment to the hinge-spindle for operating the gate-latch. Fig. 4 is a section through one of the hinges, showing means of vertical adjustment of the gate. Fig. 5 is a bottom plan view, partly in section, showing the push-pins of the sheave and the spring-rod in their normal positions relative to the gate-stile.

The gate-posts 1 and 2 are located on opposite sides of the driveway-gap, which is formed in the fence 3. This gap is normally closed by the gate 4, which is so pivoted to the post 1 by means of eye-hinges 5 and 6 and the pintle-rod 7 that the gate may be swung in either direction from a closed position. Normally the gate is locked in a closed position by a spring-latch 8, adapted when the gate is closed to engage in either direction a catch 9, secured to the fence-post 2. To hold the gate in the open position, there are located along the driveway posts 10, one at each side of the post 1, at such a distance therefrom that when the gate is opened in either direction the spring-latch of the gate may engage with a catch 11, secured to the side of each post 10, facing the fence 1. The catches 11 are provided with extensions 12, which form stops adapted to engage the gate-stile 13 and arrest the outward swing of the gate in either direction of opening and with beveled lips 14, each adapted to engage the spring-latch, spring it inward, and then release it and lock the gate in an open position when the latch has passed the lip.

The hinge-stile 15 of the gate is extended a suitable distance above the top of the gate, and near the top of the stile there is secured thereto an eyebolt-bearing 16, which projects horizontally therefrom in alinement with the hinges 6. The pintle-rod 7, which is of a length to extend through the eye-hinges 5 and 6 and the eyebolt 16, above the level of the top of the stile 15, has mounted upon the top end thereof a sheave 17, having a downward-projecting hub 18, the lower end of which rests upon the bearing-bolt 16, which supports the sheave slightly above and extending over the top of the stile 15.

To the inner side of the stile 15 above the top of the gate there is suitably secured a spring-rod 19, the free top end 20 of which extends through an aperture 21 in the spoke 22 of the sheave. A short distance above the point of fastening of the spring-rod to the gate-stile the spring-rod is embraced by a clip 23, the sides of which operate as abutments for flexing the spring-rod without injury to its fastenings. The arms of the clip 24 are respectively secured to opposite sides of the stile 15 and extend horizontally outward over and beyond the top of post 1 when the gate is in a closed position, and to the arms is secured a vane 25. The arms 24 are made of such length beyond the pivot of the gate and the vane 25 of such area that any wind-pressure on the vane will balance the wind-pressure on the surface area of the gate, whereby the opening or closing of the gate will be unaffected by wind from whatever direction it may come, the pressure thereof on the gate being neutralized by a counterbalancing pressure on the vane.

Each post 10 is provided with a bracketed arm 26, extending outward therefrom, and to the free end of each arm are secured pulleys 27 and 28.

The sheave 17 is provided with the cords 29 and 30, which are respectively central of their lengths secured to the periphery of the sheave at diametrically opposite points. From its point of fastening to the sheave each half of the cord 29 is rove half around the sheave in opposite direction to the other half and thence extends tangentially to the sheave through a pulley 27, and to the outer ends of the cord are respectively secured the weighted handles 31 and 32, which when the gate is in a closed position extend equal distances below the pulleys 27. In like manner the halves of cord 30 are rove oppositely around the sheave and extend tangentially through the pulleys 28 and are provided with weighted handles 33 and 34, depending equal distances below the pulleys. The spoke 22 of the sheave is provided with a cross-arm 22', to each end of which a depending pin 35 is secured. These pins are so located one on each side of the gate-stile as to permit the turning of the sheave in either direction within a definite arc of a circle before either of the pins contact with the side of the gate-stile adjacent to it.

Between the hinges there is adjustably mounted on the pintle-rod 7 a crank 36, to the end of which a link 37 is pivoted, which is connected by a cord 38 to the spring-latch. The cord is preferably inserted through a suitable orifice 39, formed in the hinge-stile 15, whereby a direct pull for releasing the latch from the catches is effected whenever the pintle-rod is turned by the sheave in either of the directions the pins 35 permit the sheave to turn, and during such release of the spring-latch the spring-rod is flexed until one of the pins 35 contacts with the gate-stile. By the combined action of the spring-rod and a pin, through the pulling of a cord, the gate is moved and given a momentum which will carry it to the latch-post in the direction of its swinging. When the gate has gained such momentum, the cord is released, and the spring-rod will then immediately return the sheave, the pins, and the latch to their normal relation to the gate, whereby when the gate comes in line with a latch-post the gate-latch automatically engages the catch on the post.

To equalize the stress on the posts 10 when the gate is opened or closed, the tops of the posts above the arms 26 are preferably connected by a cord 40, and to adapt the gate to be raised above accumulated ice or snow the hinges 5 are each bored to receive a vertically-adjustable sleeve 41, upon the top of which the hinges 6 are supported. The sleeves 41 are adjustably secured to the hinges 5 by set-screws 42.

Thus constructed a vehicle may be driven up toward the gate until the driver is within reach of the cord-handles, when, by pulling the handle of the cord 29 downward, the sheave will be turned, whereby the latch will be withdrawn from the catch and the spring-rod will be flexed in the direction to open the gate away from the vehicle until the gate contacts with the stop 12 in the post 10, in which position the spring-rod will return to its normal position, with the handle 31 of cord 29 lowered and the handle 32 raised. When the vehicle has passed through the gate far enough for the driver to reach the handle 32, by pulling it downward to its normal position the pintle will be turned to release the spring-latch, and the spring-rod will be flexed in the direction to close the gate, the spring-rod returning again to its normal position when the gate is closed, thereby returning the handles to their normal positions. It will thus be seen that when the gate is opened and closed from a vehicle or a horse without dismounting therefrom the cord 29 is all that is needed therefor; but where it is desired to open and close the gate from the same side without having to pass through the gate to the opposite side to release it for closing it may be closed from the same position by pulling the adjacent handle of the cord 30, whereby the latch is first released, and then the spring-rod is fully flexed in the direction for closing the gate. It is therefore apparent that the gate may be operated in the following several ways: First, that it may be opened in the direction of travel by the cord 29 and then closed by the same cord after passing through the gate, or, second, that it may be opened away from the operator from either side by the cord 29 and closed from the same side by pulling the cord 30, or, third, that it may be opened toward the operator from either side by pulling the cord 30 and then closed from the same position by pulling the cord 29, or, fourth, that it may be opened toward the operator from either side by pulling the cord 30 and then closed after passing through the gate by pulling the same cord.

The function of the spring-rod as used in my invention is mainly to return the sheave after being turned in either direction to its normal position relative to the gate, with the pins 35 both disengaged therefrom and the crank in position to unflex the spring-latch. It is manifest, however, that by increasing the resistance of the spring-rod the pins 35, although preferably used by reason of their positive action, may be omitted in gates of light construction without departing from the principle of operation of my invention. Although preferred, I therefore do not limit myself to the use of the pins.

What I claim to be new is—

1. In a fence-gate, the combination with a pair of line-posts and a pair of side posts, of a gate hinged to one line-post and adapted to swing in each direction from and to the other line-post to and from either side post, a shaft journaled vertically between the hinge-post and the hinge-stile of the gate, a sheave mounted on the top end of the shaft above the gate, a spring-rod secured by its lower end to the hinge-stile and having its upper end connected to the sheave, and adapted to be flexed thereby when the sheave is turned in either direction, pulleys pivotally supported by the side posts, a spring-latch on the free end of the gate, catches on the line-post at the free end of the gate and on the side posts adapted to engage and lock the spring-latch, a crank mounted on the shaft, means connecting the crank with the spring-latch, adapted when the crank is rocked in either direction to release the latch from the catches, and a cord centrally secured to the periphery of the sheave, and having its central portion rove one or more complete turns around the sheave and its end portions extended oppositely therefrom over the pulleys, substantially as set forth.

2. In a fence-gate, the combination with a swing hinged gate, of a rotatable pintle-rod, having a sheave and a crank fixed thereon, a spring-latch connected to the crank, a pair of pins secured to the sheave and depending therefrom on opposite sides of the gate, the pins being adapted to be respectively brought into engagement with the gate by opposite turnings of the sheave, a spring-rod having one end portion fixed to the gate, and the opposite end portion connected to the sheave and adapted when unflexed to yieldingly hold the sheave in position to dispose the pins at equal distances from the sides of the gate, and the crank in position to unlatch the spring-latch when the sheave is turned, and when flexed by the turning of the sheave to return the sheave, the pins and the crank to their normal positions relative to the gate, when the sheave is released, and means to operate the sheave from either side of the gate, substantially as set forth.

In witness whereof I have hereunto set my hand this 14th day of November, 1903.

GEORGE H. HARMAN.

Witnesses:
F. S. MACOMBER,
CHAS. A. BOOKE.